Feb. 14, 1956 C. L. HOLDEMAN 2,734,306
CONTAINER FOR FLY AND SIMILAR LURES
Filed June 29, 1953 2 Sheets-Sheet 1

INVENTOR.
Charles L. Holdeman
BY
Fishburn Mullendore
ATTORNEYS.

Feb. 14, 1956     C. L. HOLDEMAN     2,734,306
CONTAINER FOR FLY AND SIMILAR LURES
Filed June 29, 1953     2 Sheets-Sheet 2

INVENTOR.
Charles L. Holdeman
BY
Fishburn & Mullendore
ATTORNEYS.

United States Patent Office 2,734,306
Patented Feb. 14, 1956

2,734,306

CONTAINER FOR FLY AND SIMILAR LURES

Charles L. Holdeman, Grandview, Mo.

Application June 29, 1953, Serial No. 364,875

7 Claims. (Cl. 43—57.5)

This invention relates to containers for fish hooks, and artificial lures and has for its principal object to provide a container for safely and conveniently enclosing such devices and which provides for selecting and presenting the hooks or lures individually for ready removal from the container.

Other objects of the invention are to provide a container with a plurality of compartments, each having radial recesses, with the recesses in one compartment having transverse partitions forming smaller pockets for small size lures or hooks; to provide the container with covers rotatably movable in closing relation with the respective compartments and having openings adapted to register with any of the pockets and through which a selected lure is removed; to provide the covers with means to engage and lift a portion of the selected lure through the cover opening so as to facilitate removal; to provide the cover on the compartment having the transverse partitions with a lifting mechanism that is adapted for lifting a lure or hook from either the inner or outer pockets; and to provide the lifting means on the other cover so as to be operable on a slight reverse movement of the cover.

A further object of the invention is to provide a container which is adapted for construction from transparent plastic material so that the lures or hooks are visible through the walls and covers of the container.

In accomplishing these and other objects of the invention hereinafter pointed out, I have provided an improved structure, the preferred form of which is illustrated in the accompanying drawings wherein.

Referring more in detail to the drawings:

1 designates a container constructed in accordance with the present invention and which is adapted for enclosing and storing hooks and/or artificial flies, bugs, worms and like devices used by fishermen.

The container is preferably formed of transparent material such as polyethylene so that it is shatter proof and sufficiently transparent to display the lures that are to be contained therein. However, it is to be understood that other materials may be used such as a light weight metal and suitable windows provided to display the lures.

Figure 2:
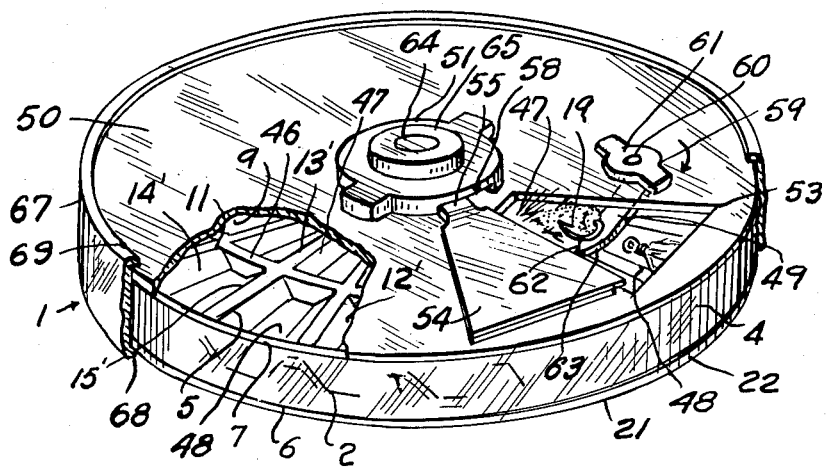
Fig. 2 is a perspective view of the container as viewed from the opposite side and illustrating the pockets on that side with the lid of the dispensing opening in open position and the lifting device being actuated to raise a lure from one of the pockets through the dispensing opening.

The container illustrated is of transparent material and includes a circular body member 2 having a central hub portion 3, an annular wall 4, and a connecting web 5 which extends from the periphery of the hub 3 to the wall 4. The web 5 divides the body member at a point between the respective edges 6 and 7 of the wall 4 into annular compartments 8 and 9 with the respective sides of the web forming the bottoms 10 and 11 of the respective compartments. The web 5 is of a generally corrugated cross section with the corrugations arranged in a circular series and extending readily from the hub 3 to the wall 4 to provide recesses 12, 12' alternating with ridges 13, 13' on the respective sides thereof, the recess 12 and ridge 13 being in the compartment 8 and the recess 12' and ridge 13' being in the compartment 9. The recesses 12 have sides 14 and 15 sloping from substantially flat faces 16 of the ridges 13 to slightly rounding bottom faces 17 to accommodate therein the body portions 18 of the lures (see Fig. 4). The recesses in the compartment 8 are for large lures and the lures are positioned therein with the hooks resting upon the flat faces 16 as shown in Fig. 2.

The recesses 12—12' are of a depth relative to the edges 6 and 7 so that the flies, when placed in the recesses, are below the plane of the edges 6 and 7 and the corresponding end surfaces 20 and 20' of the hub 3. The compartment 8 is closed by a disk like cover 21 that is of a diameter corresponding with the outer diameter of the body member 2 so that the marginal edge 22 thereof is supported by and adapted to turn in sliding contact with the edge 6 and the central portion turns on the face 20 of the hub. The outer face 23 of the cover 21 has a circular boss-like projection 24 thereon that is provided with radially extending lugs 25 which may be gripped between the thumb and the finger to rotate the cover on the body member for bringing a sector shaped opening 26 therein into registry with any one of the radially extending recesses. The opening 26 has radially extending sides 27 and 28 which are spaced apart at a distance slightly greater than the width of a radial recess 12 and its related face 16 to give ample room for inserting or removal of the flies. The inner transverse edge 29 of the opening is spaced from the periphery of hubs 3 so that it overlies the eye portion 30 of the hook to assist in insertion and retension of the flies.

Figure 3:
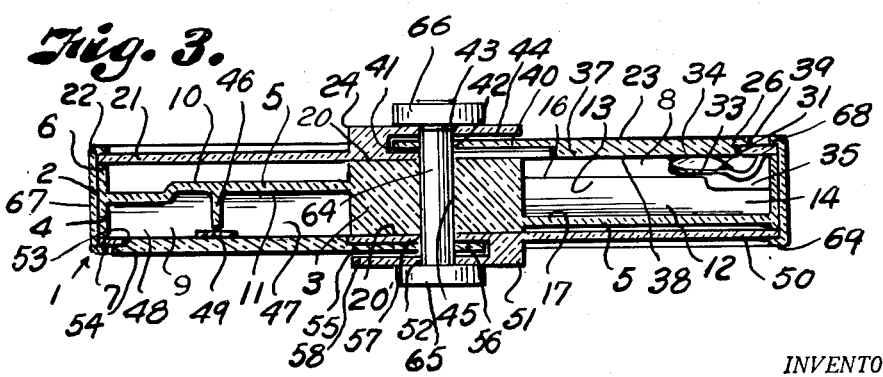
Fig. 3 is a diametrical section through the container.
Figure 4:
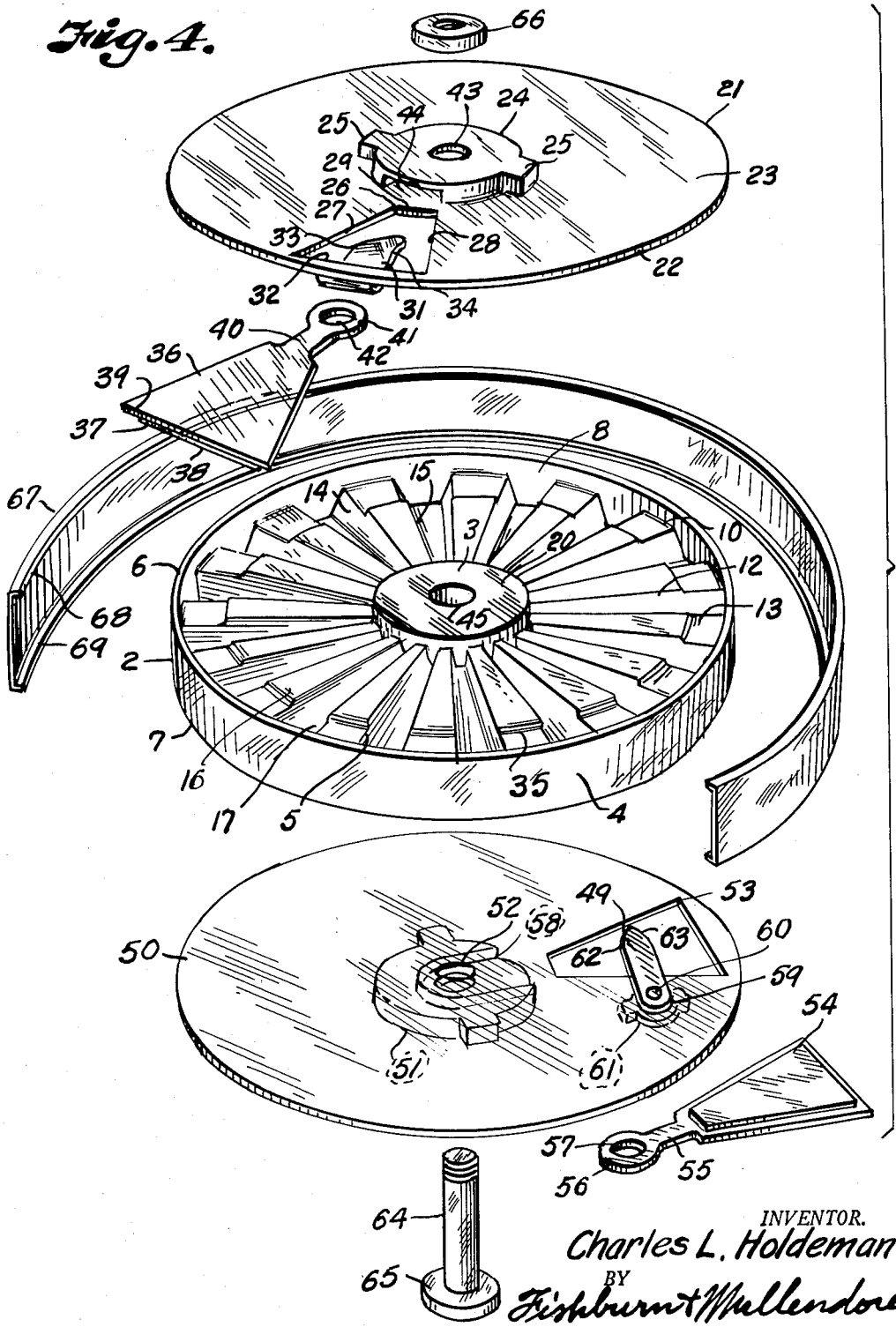
Fig. 4 is a perspective view of the parts of the container shown in disassembled spaced relation.

The flies or hooks are raised from the recesses 12 by a finger 31 that extends from the underside of the cover at the outer edge 32 of the opening 26 and terminates below the opening as shown in Fig. 4. The finger 31 is substantially flat and one side edge is relatively thin and curved as at 33 so that it slides under the hook or hook portion of the fly when the cover is rotating in a clockwise direction. The finger slopes transversely in the direction of the opening so that the opposite edge 34 clears the lures when the cover is turned in an anti-clockwise direction. The outer ends of the ridges are recessed as indicated at 35 to clear the lowest portion of the finger 31 where the finger is attached to the cover (see Fig. 3).

The opening 26 is closed by a lid 36 having a portion 37 substantially conforming to the shape and size of the opening to engage therein with the under face 38 thereof in a plane with the under face of the cover. The lid has a marginal flange portion 39 overlapping the edges of the opening 26 when the lid 36 is closed. Extending inwardly from the lid 36 is an arm 40 which terminates in an eye 41 having an axial opening 42 registering with an axial opening 43 in the boss 24 of the cover. The boss 24 is provided with a radial slot 44 through which the eye portion 41 of the lid is passed into registry with the opening 43. The openings 42 and 43 register with a similar axial opening 45 in the central hub 3.

The compartment 9 is for the small hooks or lures such as artificial bugs, worms, small flies and the like; therefore, the recesses 12' are divided midway between the wall 4 and the hub 3 by transverse partitions 46 to form inner and outer pockets 47 and 48. The recesses 12' have sloping sides 14' and 15' and the ridges 13' are spaced below the edge 7 to accommodate a finger 49, to be later described. The compartment 9 is closed by a cover 50 substantially corresponding with the cover 21 previously described. The cover 50 also has a central boss 51 that is provided with an opening 52 which registers with the axial opening 45, previously described.

The perimeter of the cover 50 overlies and slides along the edge 7 of the wall 4 in the manner of the cover 21. The cover 50 also has a sector shaped opening 53 which registers with the pockets 47 and 48 upon turning of the cover. The opening 53 is closed by a lid 54 of the same construction as the lid previously described in that it is carried by an arm 55 that terminates in an eye 56 and the eye has an opening 57 which registers with the axial opening in the boss 5. The eye 56 is extended through a slot 58 that is provided in the boss 51. The cover 50 carries a lifting device 59 that includes the finger 49 which is carried on a pin 60 rotatably mounted in the cover at a point alongside one side of the opening 53. Fixed to the pin 60 on the exterior side of the cover is a knob or key 61 by which the finger 49 may be oscillated to swing over one or the other of the pockets 47 or 48 that is exposed through the opening 53. The finger 41 is substantially flat and has rounded terminal edges 62 and 63 which are adapted to engage under the ends of the hooks or lures that are contained in the pockets. When the key 61 is turned in a clockwise position as shown by the arrow in Fig. 2, the edge 62 of the finger 49 engages the hook or lure in the inner pocket 47 and when the key 61 is turned in the opposite direction, the edge 63 engages the hook or lure in the outer pocket 48.

Figure 1:
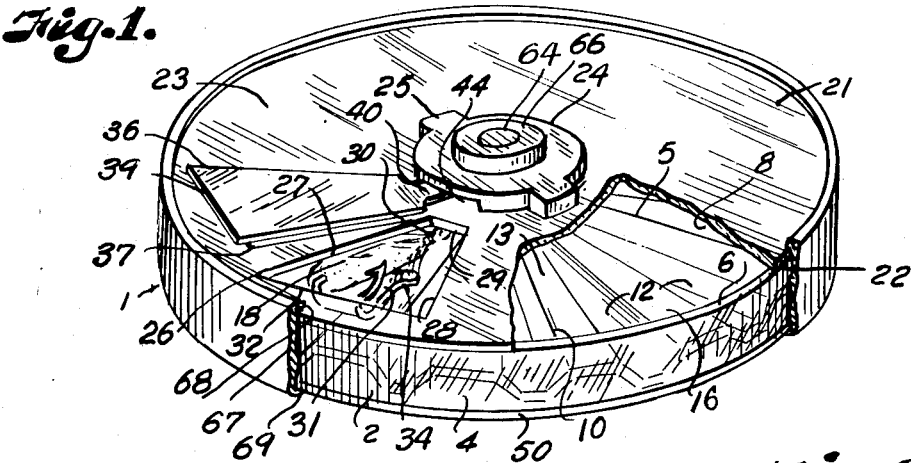
Fig. 1 is a perspective view of a container constructed in accordance with the present invention, parts thereof being broken away to better illustrate the construction, the lid for covering the dispensing opening being in open position.

The parts are retained in assembly by a spindle 64 that extends through the axial openings of the respective parts and has a head 65 engaging the boss 51 of the cover 50 and a nut 66 that is threaded on the opposite end of the spindle and engages the boss 24 of the cover 21. The outer perimeter of the respective covers 21 and 50 are retained in rotatable engagement with the edges 6 and 7 of the wall 4 by a band 67 which has inwardly extending flanges 68 and 69 on the edges thereof to engage over the outer marginal edges of the respective covers as best shown in Figs. 1, 2, and 3. The bank 67 may be formed as a continuous strip and wrapped about the body of the container. The ends of the strip are then brought together and cemented or otherwise attached to the wall 4.

In placing the large hooks and flies in the compartment 8, the lid 36 is raised from the opening 26 and turned on the spindle so that it is moved out of registry with the opening 26. A large hook or artificial fly may then be inserted through the opening into the underlying recess 12, the shank of the hook or the body portion of the lure is contained in the radial recess 12 with the curved end 19 of the hook supported upon the adjacent ridge portion 13. The cover 21 is then turned in an anti-clockwise direction to the next recess so that a fly or hook may be placed therein. The cover is again turned to bring the opening to the next recess 12 and so on around the container until all of the recesses 12 are filled with hooks or lures. After all of the recesses have been filled in the compartment 8 the lid 36 is returned to its position over the opening 26 whereupon the resiliency in the arm 40 springs the portion 37 of the lid into closing relation with the opening 26 and with the marginal flanges 39 thereof against the outer surfaces of the cover. With this arrangement the under surface of the lid registers with the inner surfaces of the cover so as to provide a smooth area and prevent the possibility of catching of the lures or hooks as the cover is rotated through its respective positions.

The container is then turned over to bring the side having the cover 50 uppermost. The lid 54 which closes the opening 53 is raised from the opening and swung to the side thereof as shown in Fig. 2.

Hooks or lures, which may be of the type of small flies or bugs or worms, are placed in the inner and outer pockets 47 and 48 which register with the opening 53, after which the cover 50 is rotated to the next recess for reception of lures in those pockets. The operations are continued until all of the pockets have been filled. Upon closure of the lid 54 the lures or hooks are safely enclosed within the container.

When it is desired to remove a hook or lure from the compartment 8, the various hooks and lures are noted through the transparent material from which the cover 21 is formed and the cover 21 is rotated in an anti-clockwise direction shown in Fig. 1, to bring the lid 36 into a position where it overlies the selected lure or hook. The lid 36 is then raised and moved laterally from the opening 26. The cover is then slightly rotated in a clockwise direction so that the finger 31 moves under the curved end 19 of the lure and raises the end 19 through the opening 26 where the lure may be readily grasped and removed from the recess. After removal of the lure the lid 36 is closed over the opening 26 to retain the other lures.

When a lure or hook is to be removed from the compartment 9, the container is turned with the lid 54 uppermost. The location of the desired lure or hook is noted through the transparency of the cover 50 and the cover 50 is rotated in anti-clockwise direction to bring the lid 54 into registry with the selected lure. The lid 54 is then moved out of position and the key 61 is turned to move the finger 41 to lift adjacent end of the selected lure, the key being turned in the proper direction, depending upon whether the selected lure is in the inner or outer pocket. The cover 50 is then turned clockwise so that the raised end is engaged by the edge forming that side of the opening 53 to further raise the hook or lure until it can be readily grasped by the fingers.

After removal of the lure or hook, the lid 54 is returned to closed position to retain the other lures.

From the foregoing it is obvious that I have provided a container which is particularly adapted for hooks, flies and similar lures and wherein the hooks or lures are kept in orderly arrangement, ready selection and removal when a certain type of hook or lure is required.

1. A container for fish lures and the like, including a case having a compartment provided with a circular series of radially extending recesses for containing the lures, a cover for the compartment, said cover having an opening through which the lures are removed from said recesses, means rotatably mounting the cover on the case at the axis of said radial recesses, and means depending from the cover at a side of said opening and terminating in a lateral portion adapted to engage under a selected lure for raising the lure through said opening in the cover to facilitate the removal of the lure.

2. A container for fish lures and the like, including a case having a compartment provided with a circular series of radially positioned recesses for containing the lures, a cover for the compartment, said cover having an opening through which the lures are removed from said recesses, means rotatably mounting the cover on the case at the axis of said radial recesses, and means depending from the cover and having a lateral portion extending toward said axis and having an edge portion inclined toward said recesses and adapted to engage under a part of a selected lure for raising the lure through said opening when the cover is rotated in one direction to facilitate the removal of the lure and to pass over said lures when the cover is rotated in the opposite direction.

3. A container for fish lures and the like, including a case having a compartment provided with a circular series of radially positioned recesses for containing the lures, a cover for the compartment, said cover having an opening through which the lures are removed from said recesses, means rotatably mounting the cover on the case at the axis of said radial recesses, a pivot pin journalled in the cover at the side of said opening, a laterally extending finger on the inner end of the pivot pin and adapted to engage under a part of a lure, and means on the pivot pin exteriorly of the cover for turning the finger to raise the lure through said opening to facilitate removal of the lure.

4. A container for fish lures and the like, including a case having a compartment, provided with a circular series of radially positioned recesses for containing body portions of said lures and having ridges intermediate said recesses to support hook portions of said lures which rest thereon, a cover for the compartment and having an opening through which the lures are removed from said recesses, means rotatably mounting the cover on the case at the axis of said radial recesses, and means depending from the cover and having a laterally extending finger portion movable over said ridges and under the hook portion for raising the hook portion of a selected lure through said opening to facilitate the removal of the lure.

5. A container for fish lures and the like, including a circular case having a transverse member dividing the case into separate compartments, said member having a circular series of radial corrugations to provide alternating radial recesses and ridges in the respective compartments for containing the lures, covers closing the compartments and spaced from the ridges to support a portion of the lures therebetween, said cover having an opening therein, and means on the covers extending into and contained in said space between the ridges and cover for engaging under a selected lure for facilitating removal of the lure through the openings in said covers.

6. A container for fish lures and the like, including a case having a compartment provided with a circular series of radially positioned recesses, a cover for the compartment having an insert opening through which lures are inserted and removed from said recesses, said cover including a central boss having a lateral slot intersecting an axial opening through said boss, a lid for the insert opening in said cover and having an arm extending through said slot of the boss and terminating in an eye in registry with the axial opening, a spindle extending axially through the case and through the axial opening in the boss including said eye to rotatably mount the cover on the case and to pivotally retain said lid in position, and means at the side of the insert opening adapted to be moved under a portion of a selected lure to raise the lure through the insert opening after movement of said lid from the insert opening.

7. A container for fishing lures of the type having a body with hook portions on one end and a line attaching portion on the other, said container including a case having compartment provided with a circular series of radial recesses for containing the body portions of the lures thereon, a cover for the compartment and having an opening through which the lures are removed from the recesses, means rotatably mounting the cover on the case at the axis of said radial recesses and spaced above said ridge portions to accommodate the hook portions of the lures therebetween, said cover at the inner side of said opening extending over the hook attaching portions of the lures, and means depending from the cover and having a portion extending toward said axis and having a laterally inclined edge portion adapted to engage between the ridged portions and the hook portion of a lure to lift the hook portion through the opening in said cover when the cover is rotated in one direction to facilitate removal of the lure and to pass over said hook portions of the lure when the cover is rotated in the opposite direction.

References Cited in the file of this patent

UNITED STATES PATENTS

| | | |
|---|---|---|
| 1,309,030 | Hawkins | July 8, 1919 |
| 1,817,562 | Hodge | Aug. 4, 1931 |
| 2,051,136 | Dormire | Aug. 18, 1936 |
| 2,076,157 | Perkins et al. | Aug. 6, 1937 |
| 2,176,232 | Warren et al. | Oct. 17, 1939 |
| 2,242,059 | DeWitt | May 13, 1941 |